United States Patent [19]

Hsu

[11] Patent Number: 4,490,445
[45] Date of Patent: Dec. 25, 1984

[54] SOLID OXIDE ELECTROCHEMICAL ENERGY CONVERTER

[75] Inventor: Michael S. Hsu, Lincoln, Mass.

[73] Assignee: Massachusetts Institute of Technology, Cambridge, Mass.

[21] Appl. No.: 381,253

[22] Filed: May 24, 1982

[51] Int. Cl.$^3$ .............................................. H01M 8/12
[52] U.S. Cl. ...................................... 429/32; 429/37; 429/21
[58] Field of Search ....................... 429/17, 21, 32, 26, 429/37, 38, 39

[56]  References Cited

U.S. PATENT DOCUMENTS

| | | | |
|---|---|---|---|
| 3,210,512 | 7/1980 | Lawrance et al. | 429/39 |
| 3,394,032 | 7/1968 | Danner | 429/39 |
| 3,432,353 | 3/1969 | Krusenstierna et al. | 429/39 |
| 3,505,114 | 4/1970 | Rohr | 429/32 |
| 3,526,548 | 9/1979 | Accorsi et al. | 429/38 |
| 3,526,549 | 9/1970 | Archer et al. | 429/32 |
| 3,554,808 | 1/1971 | Fischer et al. | 429/32 |

Primary Examiner—Donald L. Walton
Attorney, Agent, or Firm—Arthur A. Smith, Jr.; Paul J. Cook

[57]  ABSTRACT

Solid oxide electrochemical energy converters are capable of generating electricity from gaseous chemical fuels as well as producing fuels while consuming electricity. The converters consist of electrochemical cell stacks and heat exchanger stacks. An electrochemical cell stack comprises alternating solid oxide electrolyte plates and electrical conductor plates to form a electrically connected package. Means are provided to direct gases to the surfaces of the electrolyte plates where the electrodes perform the energy conversion. The heat exchanger stack consisting of multiple layers of ceramic or metal plates provides temperature conditioning on incoming reacting gases.

5 Claims, 5 Drawing Figures

SOLID OXIDE ELECTROCHEMICAL ENERGY CONVERTER

The government has rights in this invention pursuant to Contract Nos. AF19628-78-C-0002 and AF19628-80-C-0002 awarded by the United States Air Force.

BACKGROUND OF THE INVENTION

This invention relates to an electrochemical energy converter for fuel to electricity conversion under a fuel cell (electric generator) operating mode or electricity to fuel conversion under an electrolyzer (fuel synthesizer) operating mode. The converter is capable of yielding high efficiencies since its theoretical efficiency depends only on the relation between free energy and enthalpy of the electrochemical reaction and is not limited by Carnot-cycle considerations.

A key component in an electrochemical energy converter is the electrolyte on which an oxidizer electrode and a fuel electrode are applied. The electrolyte must be an ionic conductor with acceptably low resistance and must be capable of transporting an ionic reaction species from one electrode-electrolyte interface to the opposite electrode-electrolyte interface under the operating conditions for the converter. It is well known that zirconia stabilized with oxides such as magnesia, calcia or yttria satisfies the requirements when operating at high temperature (about 1800° F. or about 1000° C.). This material utilizes oxygen ions to carry electrical current. The electrolyte should be electronically non-conducting in order not to short-circuit the converter. On the other hand, the electrode must be good electron conductors. Interaction of the reacting gas, electrode and electrolyte occurs at the electrode-electrolyte interface which requires that the electrodes be sufficiently porous to admit the reacting gases and to permit exit of product gases.

Prior to the present invention, zirconia electrolyte as disclosed by U.S. Pat. No. 3,460,991 has been shaped in tubular configuration. It has proven to be mechanically delicate, prone to fracture under thermal cycling and has low volumetric power density. The design disclosed by U.S. Pat. No. 3,554,808 adopts planar configuration for the fuel cell batteries. However, the in-situ sintering of components in constructing the stack has proven difficult.

An approach to overcome these problems by forming the electrolyte in free-standing plates was disclosed by Hsu et al in the Proceedings of the 11th Intersociety Energy Conversion Engineering Conference, in the article entitled "Electrochemical Power and Hydrogen Generation from High Temperature Electrolytic Cells". This attempt has not been successful primarily due to the fact that the surface of the electrolyte has a corrugated shape which was utilized to permit passages of fuel and oxidizer. This electrolyte configuration has proven to be very difficult to fabricate since it has a tendency to fracture while being shaped. In addition, this approach does not address the synergetic needs for electric contacts and gas seals between the adjacent plates in the stack assembly to achieve low loss, high operating efficiency. Furthermore, this design does not permit the use of air or other mixture of gases containing oxygen as no means are provided for removal of the product gas at the oxidizer side.

It would be desirable to have a design of solid oxide electrochemical converter which is feasible to construct, rugged in operation and handling, flexible in fuel or oxidizer selections and which provides low electrical or fuel losses.

SUMMARY OF THE INVENTION

In accordance with this invention, an electrochemical energy converter is provided which comprises electrochemical cell stacks and heat exchanger stacks. The electromechanical cell stack is constructed from flat plates of solid oxide electrolyte which are arranged in alternating layers with plates of electrical conductors. Gas passages are provided internally through the electrolyte plate thicknesses and the electrical conductor thicknesses for feeding an oxidizer and a fuel to arrive at opposite sides of the electrolyte plates under conditions to permit oxygen ion transfer through the plate from the oxidizer to the fuel. Gas passages are also provided through the thicknesses of the electrolyte plates and electrical conductors to permit exhaust of the product gases from the electrochemical cell stack. Distribution of gases to the surfaces of the electrolyte plates are provided by means of groove networks formed by the ridges on the conductor plates. Gas seals and electric contacts between adjacent plates are obtained synergetically by pressing the ridge surfaces of the conductor plates against the adjacent flat surfaces of the electrolyte plates. Thermal stresses developed between the adjacent materials of the electrolyte plates and electrical conductors are relieved by allowing the freedom of slide motion relative to each other.

The heat exchanges stack is constructed from heat transfer plates in a fashion similar to the electrochemical stack. The heat exchanges serves to raise the temperature of the incoming reacting gases to the operation requirement. Counter-flow heat exchanging operation is chosen to extract heat from the outgoing product gases. This regenerative process drastically reduces the amount of heat to be supplied externally and consequently enhances the system efficiency of the converter.

DESCRIPTION OF SPECIFIC EMBODIMENTS

Figure 1:
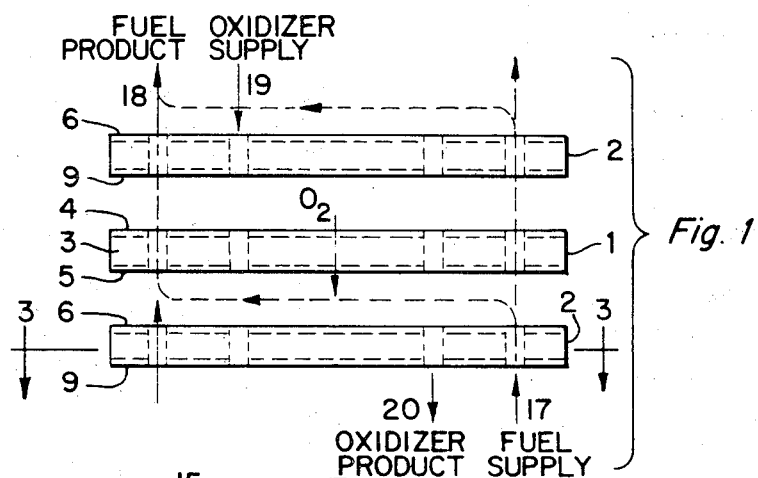
FIG. 1 is a cross-sectional view of the electrochemical cell stack of the invention.

The solid oxide electrolyte plates utilized in the present invention are prepared by a plasma-deposition process which is described in detail in a co-pending application entitled "Solid-Oxide Electrolyte Structure and Method for Forming", Hsu et al Ser. No. 382,035, filed May 26, 1982, filed concurrently herewith. Generally, the process involves the formation of solid oxide electrolyte plates from oxide particles which are first suspended in a working gas such as nitrogen or argon and the suspension then is passed through an arc discharge. The oxide particles are heated by the discharged gas to their molten state and ejected from a nozzle onto a substrate. A requisite degree of roughness and oxidation of surface will allow particles to adhere until a continuous coating of desired thickness is formed. The coating can then be removed to become a free-standing plate. The plate is sintered in order to impart desired electrical and mechanical properties to the plate. Thereafter, the fuel electrode and oxidizer electrode are deposited on opposite sides of the plate by flame-deposition which produces coatings of a desired porosity 30–40%. Generally electrolyte plate thickness is between 0.01 and 0.02 inch and the electrode thickness is from 0.003 to 0.005 inch.

The electrochemical energy converter of this invention comprises flat electrolyte plates and electrical conductor plates stacked in alternating relationship. The electrolyte plates are made of zirconia in mixture with magnesia, calcia or yttria to acquire good oxygen-ion transport property. Opposing flat surfaces of these zirconia electrolyte plates are coated respectively with a fuel electrode material and an oxidizer electrode material. Suitable oxidizer electrode materials include perovskites, such as $LaMnO_3(Sr)$. Suitable fuel electrode materials include cermets such as $ZrO_2/Ni$. The conductor plate is formed from a heat resistant electrical conducting material such as Inconel or cermets such as $ZrO_2/Ni$. Both the conductor and electrolyte plates are provided with holes as the passages for fuel, oxygen containing gases which are introduced into the stack as the passages for product gases which are removed from the stack.

When operating as a fuel cell, the electrolyte and conductor plates are shaped to cooperate with the transverse holes so that oxygen is introduced only on the surface of the electrolyte plate having the oxidizer electrode material, while the fuel is introduced only on the surface of the electrolyte plate having the fuel electrode material. The conductor and electrolyte plates are held in tight relationship about their circumference by means of rods which extend through holes in the stack in order to minimize leakage of gas out of sides of the stack. Alternatively, the stack could be clamped in order to prevent this leakage. In one embodiment of this invention, the stack is provided with a heat exchange device formed integrally with the stack which effects heat exchange from the outgoing product gas to the incoming fuel gas and oxygen-containing gas prior to the oxygen-containing gas entering the electrochemical energy connectors. This is because it is desirable to effect high conductivity of the electrolyte generally within the range of about 90° and about 110° C., preferably about 1000° C. By operating with the heat exchanger, thermal efficiencies can be improved. Generally, the heat exchanger comprises a series of two alternating sets of plates, one set being flat and the other set having ridges in a pattern such as is used for the conducting plates in the electrochemical energy convertor. The incoming gas passes along one surfaces of the plates having ridges, the outgoing gas passes separately along the opposite surface of the plate having ridges so that the incoming gas becomes heated prior to entering the electrochemical energy connector.

Figure 2:
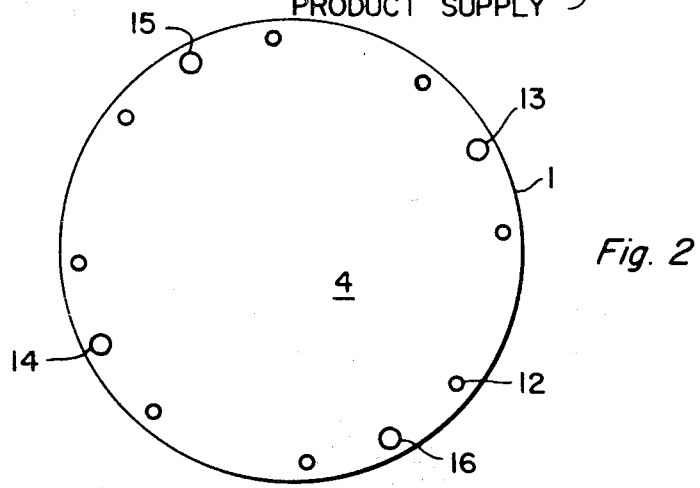
FIG. 2 is a top view of the electrolyte plate used in the electrochemical cell.
Figure 3:
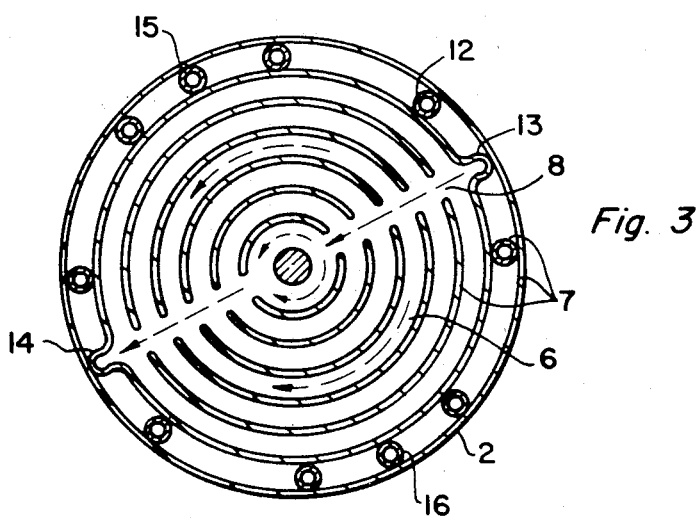
FIG. 3 is a top view of the electrical conductor used in the electrochemical cell.

This invention will be fully explained with reference to the accompanying drawings. Referring to FIGS. 1, 2 and 3, the basic cell unit in the electrochemical cell stack comprises single electrolyte plate 1, and single conductor plate 2. The electrolyte plate 1 is made of stabilized zirconia $ZrO_2 \cdot (Y_2O_3)$, component 3, on which porous oxidizer electrode 4 and porous fuel electrode 5 are coated. Preferred materials for oxidizer electrodes are perovskites such as $LaMnO_2(Sr)$. Preferred materials for fuel electrodes are cermets such as $ZrO_2/Ni$. The conductor plate 2 is made of metal such as Inconel or cermets such as $ZrO_2/Ni$. It serves as: electric connection between adjacent electrolyte plates 1; gas partitions to achieve unipolar stack; and heat conduction path between electrode surfaces 4, 5 and the edge of the plates 1, 2.

Fuel supply is fed to the stacked cell unit through axial (with respect to the stack) manifold 17 provided by holes 13 and its product is exhausted through manifold 18 provided by holes 14. Fuel is distributed over the fuel electrode surface 5 through in plane groove network 6 formed in the upper surface of the conductor plate 2. Notches 8 made in ridges 7 provide openings connecting manifold 17, 18 through holes 13, 14 to fuel electrode 5. Oxidizer supply is fed to the stacked cell unit through manifold 19 provided by holes 15 and its product is exhausted through manifold 20 provided by holes 16. Oxidizer is distributed over the oxidizer electrode surface 4 through in plane groove network 9 formed in the lower surface of the conductor plate 2 of the adjacent cell unit. Notches similar to notches 8 in ridges similar to ridge 7 provide openings connecting manifolds 17, 18 through holes 13, 14 to oxidizer electrode 4. The ridges 7 and 10 forming side walls of the groove networks 6 and 9 on the conductor plates 2 are brought in contact with electrolyte plates 1 in stack assembly. The ridges 7 and 10 are pressed against the porous electrode 5 and the electrode 4 of the adjacent cell unit, respectively in assembly to achieve electrical contacts. The ridges at the outer edge of the conductor plates 2, the ridges along the edge of bolt holes 12, the ridges along the edge of the upper surface of the conductor plates 2 around the holes 15, 16 and the ridges of the lower surface of the conductor plates 2 around the holes 13, 14 are brought in contact with surface coating which has identical structure as the electrode coatings. These circumferential ridges which are not notched are pressed against the porous coating 4, 5 in assembly to achieve gas seals. Water-cooled tension rods (not shown) which are concealed in bolt holes 12 are used to provide the assembly force.

Figure 4:
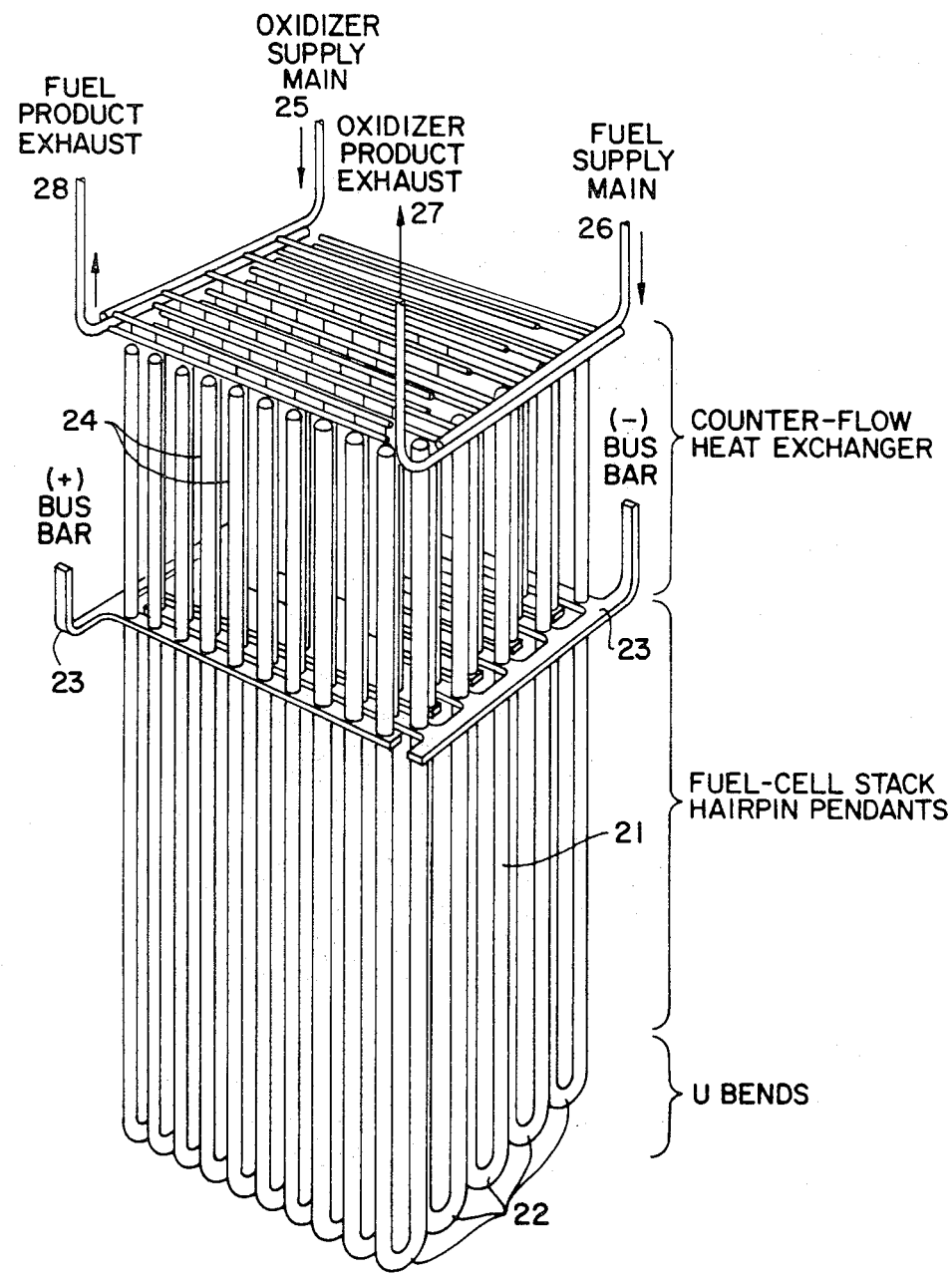
FIG. 4 is an isometric view of an electrochemical energy converter of this invention including a heat exchanger.

Referring to FIG. 4, the electrochemical cell stacks can be paired to form hairpin pendants 21 with U bends 22 to achieve better structural rigidity and more convenient one-side terminations for gas manifolding and electric connections. Bus bars 23 are provided to tap or supply electricity to the electrochemical pendants 21 which are in multiple parallel electrical connections.

Figure 5:
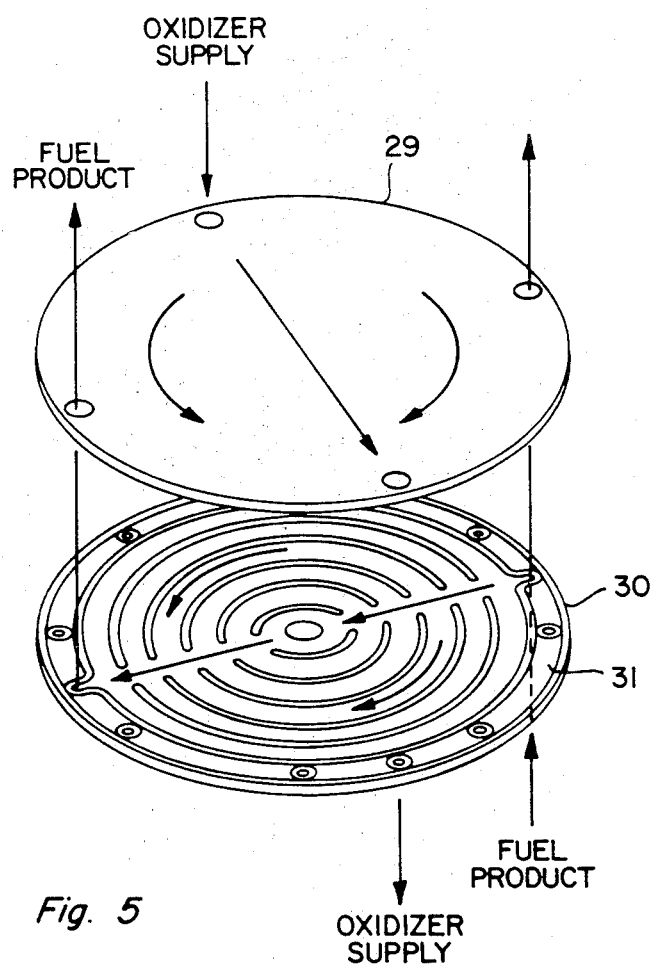
FIG. 5 is an isometric view of the components forming the heat exchanger section of the inverter.

The electrochemical cells operate efficiently at an elevated temperature (1800° F. or 1000° C.) Heat exchanger stacks 24 are provided and placed at the top of the electrochemical cell stacks. The heat exchanger serves as: thermal conduction buffer between hot electrochemical cell stacks 21 and external structures; and gas temperature conditioners which heat the incoming reacting gases by the outgoing product gases with a counter flow scheme, as shown in FIG. 5. The heat exchanger stack 24 is constructed from flat heat exchanger plates 29 which are arranged in alternating layers with partition plates 30. Internal passages for feeding and exhausting of gases, and groove networks for distributing gases over heat exchanger plates are provided in designs identical to that in the electrochemical stack. Ridges 31 on partition plates 30 are pressed against the flat surfaces of the adjacent heat exchanger plates 29 to define gas flow patterns and gas seals. As shown in FIG. 5, the oxidizer supply passes across the top surface of a heat exchanger plate 29 while fuel product passes across the bottom surface of heat exchanger plate 29 and the top surface of partition plate 30. An indirect heat transfer occurs across the thickness of heat exchanger plate 29. The heat transfer efficiency is determined by the dimensions of the grooves in the partition plate 30, thickness of heat exchanger plate 29 and its thermal property. At high temperature region (over 900° F. or 500° C.) inconel or ceramic such as alumina is required for the construction of the heat exchanger.

The oxidizer supply main 25, fuel supply main 26, and product exhaust 27, 28 are located at the low temperature ends of the heat exchanger stacks 24. Water-cooled tension rods concealed in bolt holes 12, as described, are used to assemble the electrochemical cell units together with the heat transfer plates. Spring loading is utilized to accommodate thermal expansions in thickness of the plates. Springs (not shown) are located at the low temperature ends of the heat exchanger stacks 24.

It is to be understood that the apparatus of this invention can be utilized as fuel cells (electric generator) when gaseous fuel is supplied or be applied as electrolyzer (fuel synthesizer) when electricity is applied. It is applicable to all reversible reactions involving exchanging of oxygen such as:

$$H_2 + \frac{1}{2} O_2 \rightleftharpoons H_2O$$

$$SO_2 + \frac{1}{2} O_2 \rightleftharpoons SO_3$$

$$CO + \frac{1}{2} O_2 \rightleftharpoons CO_2$$

and $$NH_3 + \frac{5}{4} O_2 \rightleftharpoons NO + \frac{3}{2} H_2O$$

I claim:

1. A solid oxide electrochemical energy converter which comprises alternating layers of solid oxide electrolyte plates and electrical conductor plates, each electrolyte plate having a coating of a porous oxidizer electrode on a first surface of said electrolyte and a coating of porous fuel electrode on a second surface of said electrolyte, each conductor plate having groove networks formed by ridges to define gas passages on both surface of said conductor plate, said ridges being in electrical contact with the electrode coatings on next adjacent electrolytes and has means for tapping electricity from or introducing electricity into said converter, said conductor plates having circumferential ridges arranged along the edges of said conductor plate to define gas seals, said ridges being in contact with surface coatings on next adjacent electrolyte plates which surface coatings have the same composition as the composition forming electrode coatings.

2. The converter of claim 1 wherein four sets of manifolds are formed by aligned holes extending through said electrolyte plates and said conductor plates are arranged (a) for feeding an oxidizer supply to contact only the oxidizer electrode of each said electrolyte; (b) for feeding a fuel supply to contact only the fuel electrode of each said electrode; (c) for removing oxidizer product gases from the oxidizer electrode; and (d) for removing fuel product from the fuel electrode of each said electrolyte.

3. The converter of claim 1 wherein alternating layers of stabilized electrolyte plates and said electrical conductor plates form a cylindrical-shaped cell stack.

4. The converter of claim 1 wherein said alternating layers of solid oxide electrolyte plates and electrolyte conductor plates are formed into a stack of said electrolyte plates and said electrical conductor plates to form a U-shaped cell assembly.

5. The converter of claim 1 which includes means for passing hot product gases from said converter in indirect counter flow heat exchange relationship with an oxidizer supply and fuel supply.

* * * * *